United States Patent [19]

Bohn

[11] Patent Number: 4,699,570
[45] Date of Patent: Oct. 13, 1987

[54] VACUUM PUMP SYSTEM

[75] Inventor: Heinz Bohn, Rullstorf, Fed. Rep. of Germany

[73] Assignee: ITT Industries, Inc, New York, N.Y.

[21] Appl. No.: 837,429

[22] Filed: Mar. 7, 1986

[51] Int. Cl.$^4$ ............................................. F04B 37/14
[52] U.S. Cl. ......................................... 417/6; 417/22; 417/69
[58] Field of Search ................... 417/2, 3, 4, 5, 6, 68, 417/69, 22, 42

[56] References Cited

U.S. PATENT DOCUMENTS

| | | | |
|---|---|---|---|
| 2,397,443 | 3/1946 | Statham et al. | 417/2 X |
| 2,813,231 | 11/1957 | Hyde | 417/2 X |
| 2,926,835 | 1/1960 | Lorenz | 417/2 |
| 2,971,691 | 2/1961 | Lorenz | 417/69 |
| 3,817,658 | 6/1974 | Murase | 417/2 |
| 3,847,507 | 11/1974 | Sakiyama et al. | 417/22 |
| 4,087,208 | 5/1978 | Uda et al. | 417/68 |
| 4,225,288 | 9/1980 | Mugele et al. | 417/69 |

FOREIGN PATENT DOCUMENTS

| | | | |
|---|---|---|---|
| 3420144 | 12/1985 | Fed. Rep. of Germany | 417/68 |
| 3425616 | 1/1986 | Fed. Rep. of Germany | 417/68 |
| 2888 | 7/1985 | PCT Int'l Appl. | 417/22 |

OTHER PUBLICATIONS

Bartels, D.; Reinhardt, H.-G., Elmo Units–Automatically Controlled Compressor Systems for Process Engineering, Siemens Review XXXVII, (1970), No. 10, vol. 37, pp. 535–539.

Primary Examiner—Leonard E. Smith
Attorney, Agent, or Firm—Menotti J. Lombardi

[57] ABSTRACT

A vacuum pump aggregate utilizes a microprocessor in conjunction with pressure and temperature sensors and motor control circuits to regulate the pressure by varying the speed of one or more vacuum pumps. Measured temperature and/or pressure values are compared with predetermined values by the microprocessor which in turn adjusts the speed of the motors.

18 Claims, 4 Drawing Figures

VACUUM PUMP SYSTEM

BACKGROUND OF THE INVENTION

This invention pertains to a vacuum pump system.

Vacuum processes in closed systems must typically either reach a predetermined absolute low pressure within the shortest possible time and stay at this pressure level, or they have to follow a specific predetermined pattern of pressure changes. In the past, pressure variations have been accomplished by manual or automatic operation of valves.

Piston pumps are advantageously used in vacuum systems for evacuation of containers and for maintaining very low pressures in containers. These pumps are highly reliable because of their lack of valves and generally simple construction. However, one disadvantage of cylinder piston pumps is that they are extraordinarily noisy during operation at slight underpressures, that is, during the beginning of evacuation of a container. This occurs because the drive motor is subjected to substantial stresses and the cylinder piston pump is subjected to considerable thermal stress.

SUMMARY OF THE INVENTION

In accordance with the invention a second pump is connected to the piston pump. Further in accordance with the principle of the invention, regulation of the piston pump is accomplished by varying the speed of the pump.

Sensors are used to measure operating parameters of the pump system such as pressure and temperature in the piston pump suction line, pressure and temperature between the second pump and the piston pump, speed of the piston pump, current consumption of the drive motor of the piston pump, torque of the piston pump, or the like.

Control circuits compare the measured parameters with predetermined values and control the speed of the piston pump.

Further in accordance with the invention a microcomputer system is used to compare the measured parameters with desired parameters. The desired parameters are stored in memory or calculated by the microprocessor which in turn provides variable speed control of the piston pump.

Further in accordance with the invention, the speed of the second pump is also variable and controlled by the microcomputer system.

Still further in accordance with the invention, the second pump is a water ring vacuum pump. The speed of the piston pump is varied according to the difference between the measured suction temperature of the water ring vacuum pump and a desired temperature which is dependent on the intermediate pressure between the water ring vacuum pump and the cylinder piston pump. The speed of the water ring vacuum pump can be adjusted between a pump specific maximum and minimum value according to a preset ideal value of the operational water temperature of the water ring vacuum pump.

BRIEF DESCRIPTION OF THE DRAWING

The invention will be better understood from a reading of the following detailed description in conjunction with the drawing in which:

Turning now to FIG. 1 a container 1 is to be evacuated by a pump system. Container 1 is coupled through opened valve 2 to piston pump 10 which is driven by motor 12. Pressure Sensor 3 measures the suction pressure at the inlet to piston pump 10 and temperature sensor 4 measures the inlet temperature. The exhaust of cylinder piston pump 10 is coupled to the suction inlet of water ring vacuum pump 11. Water ring vacuum pump 11 is driven by motor 13. Temperature sensor 5 and pressure sensor 6 are disposed in the line between the water ring vacuum pump 11 and piston pump 10. A temperature sensor 7 is connected to measure the temperature of the water of water ring vacuum pump 11. The exhaust of water ring vacuum pump 11 is coupled to a gas/liquid separator 17. Fresh water is added via valve 18. The speed of motor 12 is sensed by speed sensor 14, its torque by sensor 15 and the electrical current drawn by the motor 12 is sensed by current sensor 16.

Figure 1:
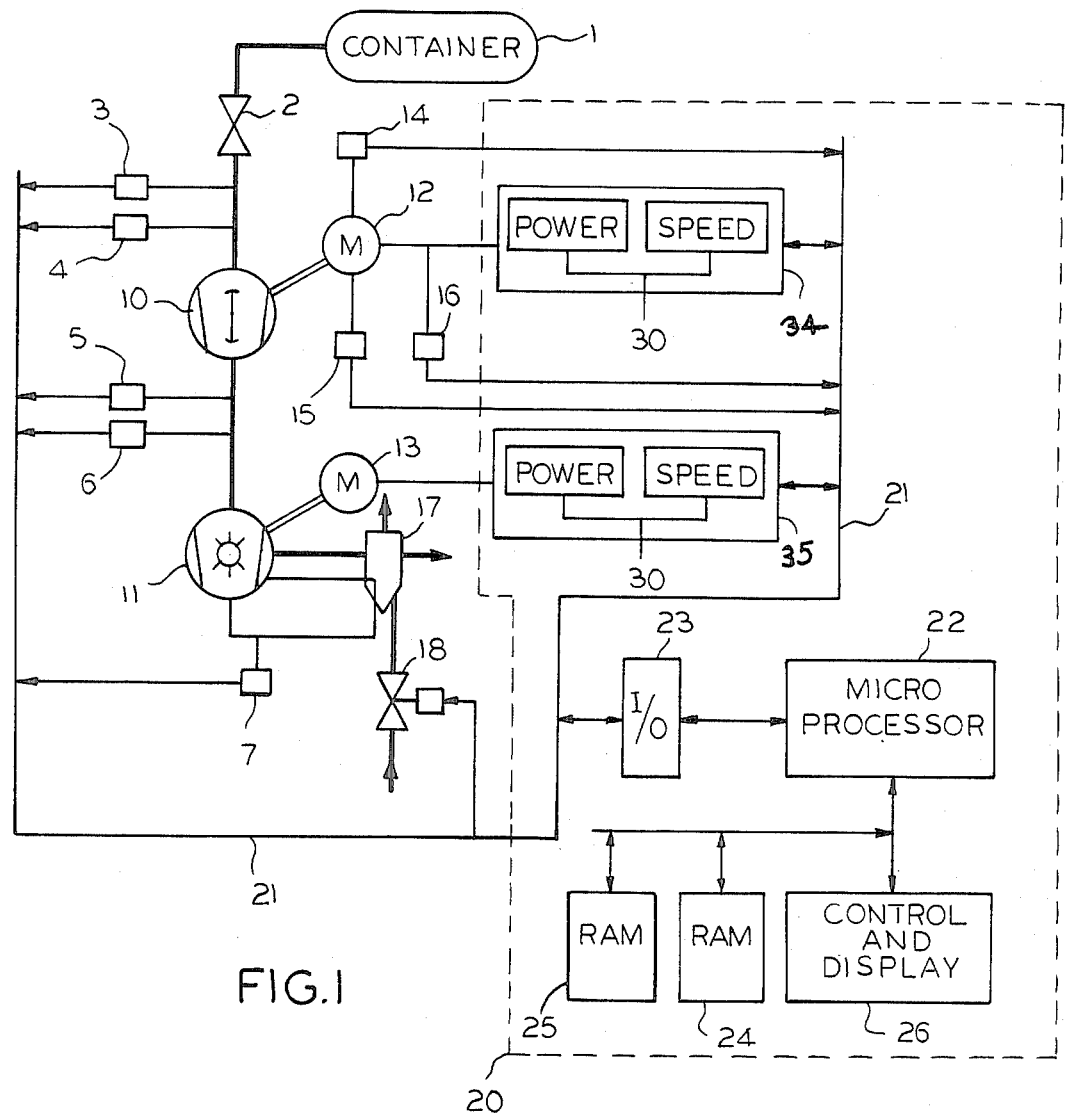
FIG. 1 illustrates schematically a 2 stage pump system in accordance with the invention.

Each of the pressure sensors 3, 6, temperature sensors 4, 5 and 7, speed sensor 14, torque sensor 15 and current sensor 16 are coupled to the inputs of controller 20 via input/output (I/O) bus 21. The sensor inputs are coupled to a microprocessor 22 via an input/output interface 23. The microprocessor 22 controls the speed of piston pump motor 12 and water ring vacuum pump motor 13 via power control circuits 34 and 35 respectively. Power control circuits 14 and 15 provide power on-off control of motors 12 and 13 and speed control by, for example, phase and/or frequency control.

Data measured by the various sensors are stored in the random access memory 24. The programs for operation of the microprocessor are stored in read only memory 25. The microprocessor is manually controlled via a control and display panel 26.

Figure 2:
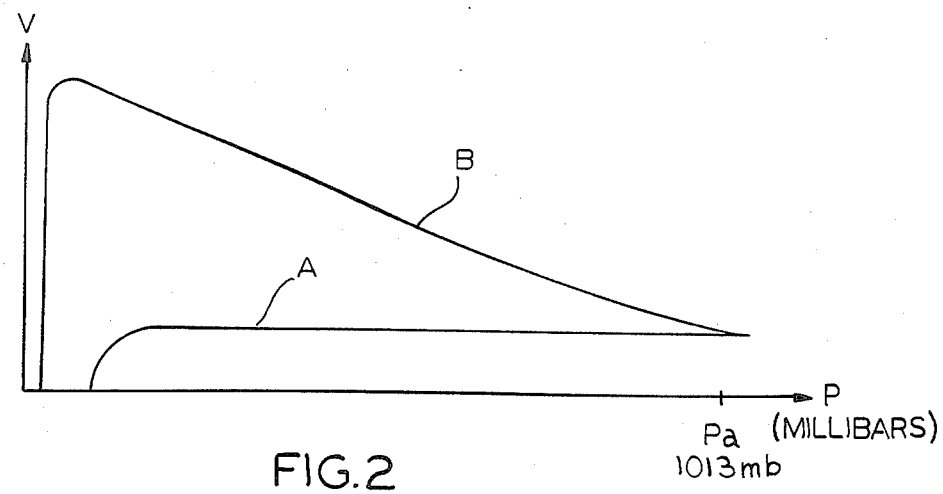
FIG. 2 illustrates the pressure-volume characteristic curves of such an arrangement.

As the curves in FIG. 2 show, both vacuum pumps simultaneously begin operations at atmospheric pressure Pa. Curve A shows the pressure versus volume characteristic of the water ring vacuum pump. Curve B illustrates the pressure-volume characteristics when both the piston pump and the water ring vacuum pump are operating. Both pumps simultaneously begin their operation at atmospheric pressure Pa. The piston pump begins at relatively slow speed and its speed increases with increasing vacuum so that its pressure-volume curve corresponds roughly to the shape of curve B. The effect of the piston pump is slight initially and continually increases. If the water ring vacuum pump is at its operational limit as shown at the left end of curve A, the piston pump alone is operated.

Figure 3:
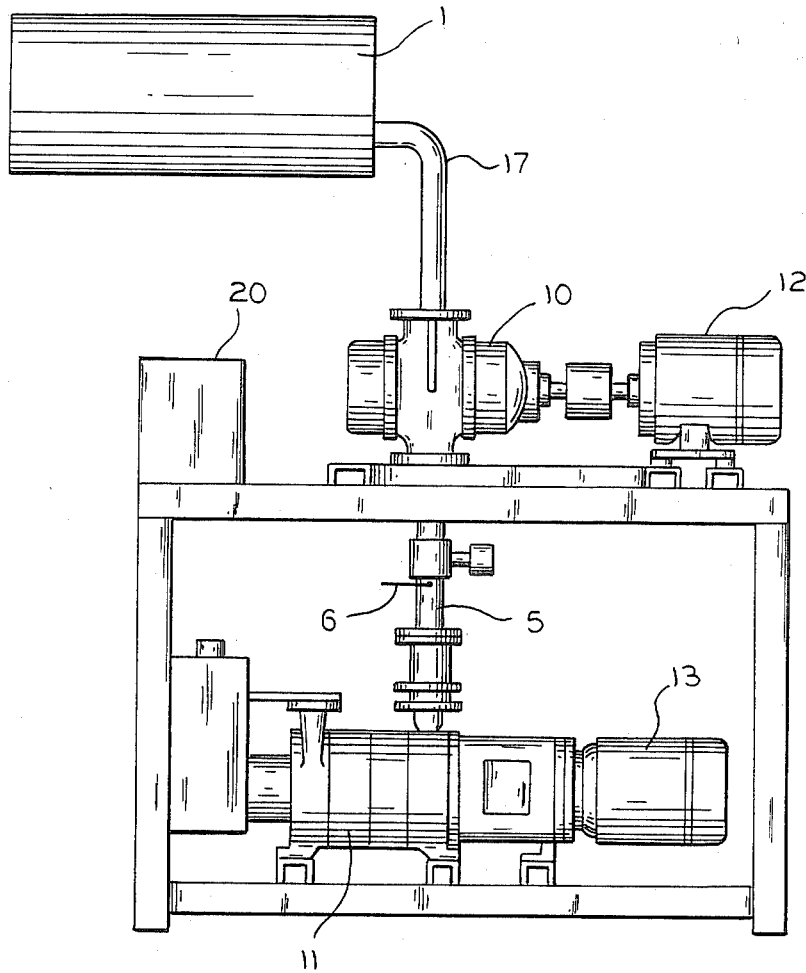
FIG. 3 illustrates a vacuum pump unit with a piston pump and a water ring vacuum pump.

A pump unit in accordance with the invention is shown in FIG. 3. A water ring vacuum pump 11 with its drive motor 13 and a piston pump 10 with its drive motor 12 are mounted in a frame 23. The controller 20 shown in FIG. 1 for the pump motors in which measured parameters are compared with ideal valves of those parameters is not shown but can be mounted to frame 40. The water ring vacuum pump 11 creates a suction pressure which is measured by pressure sensor 6.

The piston pump 10 lowers suction pressure in container 1 via suction tube 17. The speed of the piston pump is adjusted in accordance with different programs in the controller 20. An ideal temperature at the exhaust of piston pump 10 and dependent on the pressure measured by pressure sensor 6 is calculated by controller 20. The temperature at the exhaust of piston pump 10 is measured by temperature sensor 5 and the controller 20 regulates the piston pump in accordance with the ideal temperature.

Figure 4:
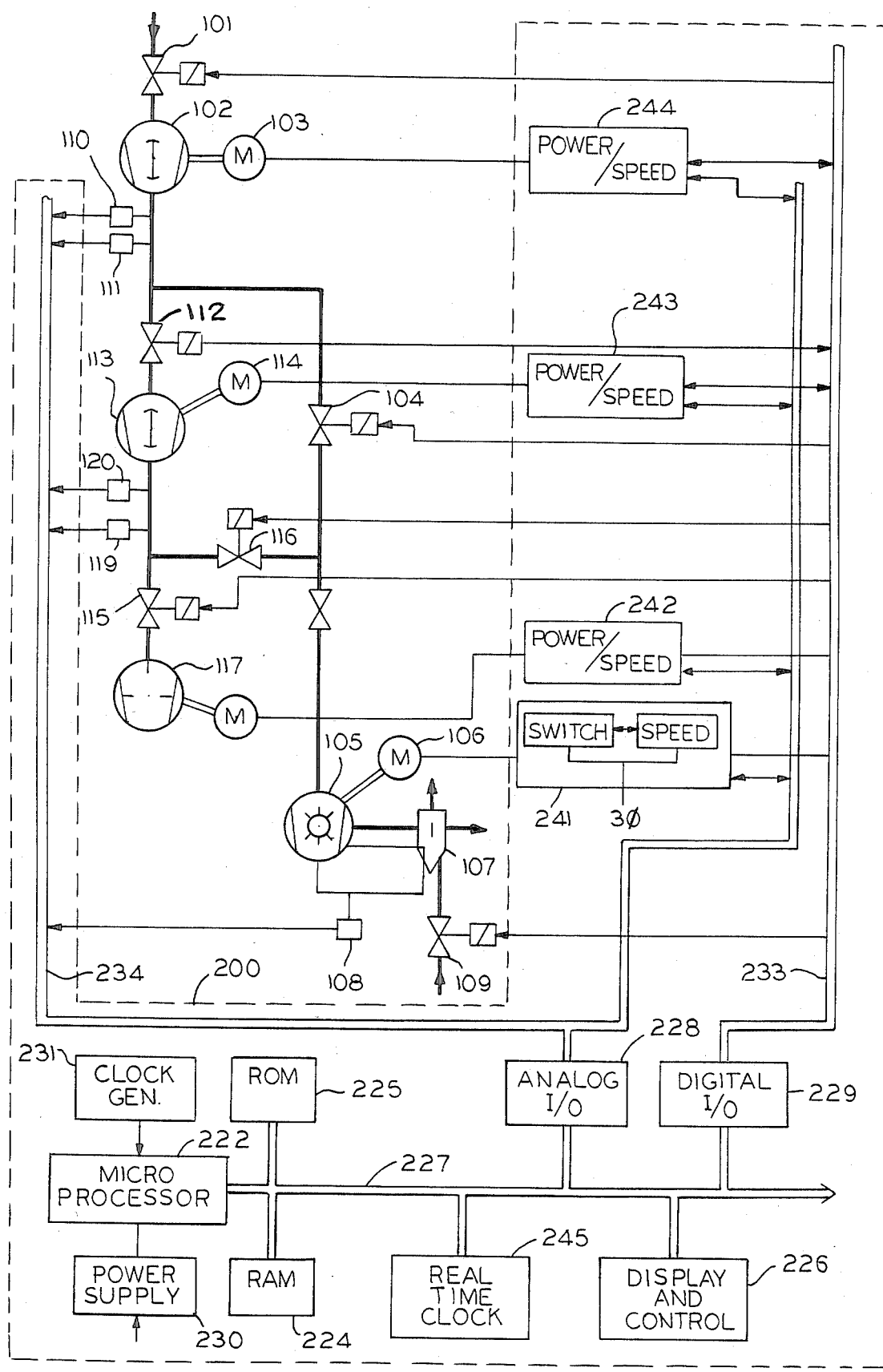
FIG. 4 illustrates a four stage pump system in accordance with the invention.

Turning now to FIG. 4 a second pump unit to which the principles of the invention advantageously apply will be described. As with the embodiment described with reference to FIGS. 1 to 3, the embodiment of FIG. 4 uses speed adjustment of piston pumps rather than mechanical bypassing.

The gas to be evacuated goes through opened valve 101 into piston pump 102 which is driven by motor 103. The gas then flows through opened valve 104 and is exhausted from water ring vacuum pump 105 into the atmosphere after flowing through water gas separator 107. Water ring vacuum pump is driven by motor 106. A temperature sensor 108 measures the water temperature of water ring vacuum pump 105. In response to the measured water temperature, magnetic valve 109 is controlled to minimize fresh water consumption of the water ring vacuum pump. Temperature sensor 110 and pressure sensor 111 are connected to the exhaust line of piston pump 102 and are used by controller 200 to determine the speed of the pump motor 103 of piston pump 102. Valve 112 is closed, piston pump 113 driven by motor 114 is inactive, valves 115 and 116 are closed and rotary vane pump 117 driven by motor 118 is inactive.

With further falling suction pressure, the speed of piston pump 102 rises. When a predetermined pressure is detected by pressure sensor 11, the control circuits cause valve 104 to close and valves 112 and 116 to open.

Piston pump 113 driven by motor 114 is started.

Pressure sensor 119 and temperature sensor 120 monitors the exhaust line of piston pump 113. Temperature sensor 110, 120 and pressure sensors 111, 119 respectively provide measured temperature and pressure parameter information to controller 200 which regulates operation of piston pumps 102 and 113 via motors 103 and 114 respectively.

When pressure sensor 111 measures another predetermined, but lower, pressure, controller 200 causes valve 115 to open and starts rotary valve pump 117 which is driven by motor 118. Shortly afterwards, controller 200 causes valves 104, 116 and 109 to close and switches power off to motor 106 of water ring vacuum pump 105.

During disconnection of the pump unit, controller 200 causes valves 101 and 115 to close and shortly afterwards switches off power to motors 103, 114 and 118 to turn off piston pumps 102, 113 and rotary vane pump 117.

Controller 200 again comprises a microprocessor 222 which may be of a type known in the art and commercially available. Microprocessor 222 receives power from a power supply 230. A clock source 231 is provided for the microprocessor as is conventional in the microprocessor arts. A data/address bus 227 couples microprocessor 222 to a read only memory (ROM) 225, a random access memory (RAM) 224, a display and control panel 226, real time clock source 228 and input/output interface circuits including analog interface input/output circuits 228 and digital interface input/output circuits 229. Each of the magnetically actuated valves is coupled to the digital interface I/O circuits 229 via digital I/O bus 233. Additionally the power switch portion of each power/speed control circuit 241, 242, 243, 244 is coupled to the digital I/O bus 233. The temperature sensors 108, 110, 120, the pressure sensors 112, 119 and the power speed control circuits 241, 242, 243, 244 are coupled to the analog interface I/O circuits 228 via analog I/O bus 234. Additionally as in the embodiment of FIG. 1, each of the motors 103, 114, 118 and 106 may have speed, current, and power sensors coupled to the analog I/O bus 234 via the respective power/speed circuits. For clarity, separate connections for these sensors are not shown in FIG. 4. Each temperature sensor 108, 110, 120 and each pressure sensor 111, 119 may be of conventional design. Likewise each magnetically operated valve 101, 104, 109, 112, 115, 116 may be of conventional design. The power/speed circuits 241, 242, 243, 244 each may comprise known power switching circuits for power control and known speed control circuitry for controlling the speed of the respective motors. As will be understood by those skilled in the art, the digital interface I/O circuits comprise primarily addressable data registers for controlling and monitoring the operation of elements connected thereto. Showing specific details of such circuits would not aid an understanding of the present invention and accordingly, these conventional circuits are not shown in specific detail. The analog interface I/O circuits also include addressable data registers for controlling and monitoring the operation of elements connected to analog I/O bus 234 but in addition include analog-to-digital and digital-to-analog circuits as well as voltage conversion circuitry to interface the analog elements connected thereto to the analog-to-digital and digital-to-analog converters. These circuits are also well known in the art and the showing of each of the individual circuits has likewise been omitted in the interest of clarity.

The operation of the system of FIG. 4 may be initiated and controlled via the display and control panel 226 or it may also be initiated at specific times of the day as determined by real time clock circuit 245 which provides time of day signals to microprocessor 222. Time of day signals are used, for example, when the pressure to be maintained must be varied in accordance with a predetermined pattern over a period of time. The random access memory 224 is used to store data derived from the power sensors and circuits coupled to the microprocessor 222. The read only memory 225 may be an electrically programmable read only memory (EPROM) or any of the read only memories known in the art and may in fact comprise several read only memories. The read only memory 225 is used to store the programs for controlling the operation of the system. Additionally, read only memory 225 may be used for storing so called "firm ware" which defines the characteristics of each of the specific pumps.

With respect to the water ring vacuum pump 105 of FIG. 4 and the water ring vacuum pump 11 of FIG. 3, as is well known in the art, these pumps operate as positive displacement pumps. The eccentric water ring formed in each pump works as pistons in the chambers formed by the impeller plates. In addition to the positive displacement effect, the condensation of vapor can have additional positive impact on the capacity of a water ring vacuum pump.

For a constant inlet pressure, the capacity can be varied by the speed of the pump or by the temperature of the operating water. The maximum speed of the pump is limited by the strength of the material used for the pump shaft or impeller plates. The nominal speed of the pump usually can be exceeded by about 20% to 30%.

The minimum speed is limited by the stability of the rotating water ring. Usually the minimum speed is about 50% of the nominal speed. Therefore, the degree of control for a nominal capacity downward is limited. The pressure sensor 6 in FIG. 1 and 111 in FIG. 4 measures the actual suction line pressures. These pressures are compared to an expected suction pressure by microprocessors 22 and 222 respectively. In the case of variances, the microprocessors vary the speed of the respective pump motors 13 and 107 until the measured and expected pressures are equal.

The liquid pistons working between the impeller plates fill the positive displacement chambers with their own vapor more or less in dependence on the water temperature. Increasing water temperature means that more of the volume is filled by vapor and less volume is available to evacuate and compress the gas to be evacuated.

By monitoring the water temperature via temperature sensors 7 in FIG. 1 and 108 in FIG. 4, the respective microprocessor determines whether additional cold fresh operating water should be added into the loop by opening valve 18 or 109 respectively.

To reduce the capacity of the water ring vacuum pumps, the valve 18 or 109 is kept closed. By closing the water valves, the operating water is heated up in the closed loop by absorption of energy. The capacity is thereby reduced.

As pointed out hereinabove, the characteristics of the various pumps used are stored in read only memories. Those memories may contain the parameters defining the characteristics of the pumps. Each pump can be characterized by a family of curves which can in turn be defined by means of equations. For example a family of quadratic equations may be used to define the various characteristic curves. Storing of the coefficients for the quadratic equations in the read only memory permits the microprocessor to calculate the desired parameters.

What is claimed is:

1. A vacuum pump arrangement comprising:
   a suction inlet;
   a first vacuum pump coupled to said suction inlet and having a first drive motor;
   a second vacuum pump serially coupled to said first vacuum pump and having a second drive motor;
   sensors for measuring predetermined operational parameters of said arrangement;
   at least a first motor speed circuit coupled to one of said first or second drive motors and responsive to control signals for varying the speed of said one drive motor;
   interface circuits coupled to said sensors; a microprocessor coupled to said interface circuits and to said motor speed circuits and operational to compare the values of parameters measured by said sensors to predetermined parameters to generate said control signals whereby the speed of said one drive motor is adjusted;
   said sensors comprising a first temperature sensor and a first pressure sensor coupled to the exhaust line of said first pump;
   said first motor speed circuit being coupled to said first motor; and said microprocessor being responsive to said first temperature sensor and said first pressure sensor to determine a desired speed of said first motor and to provide control signals to said first motor speed circuit to adjust the speed of said first pump.

2. A vacuum pump arrangement in accordance with claim 1, wherein:
   said second pump is a liquid ring vacuum pump;
   said sensors include a temperature sensor for measuring the temperature of operating liquid;
   said arrangement comprising an electrically actuable valve for controlling the supply of fresh operating liquid to said liquid ring vacuum pump; and
   said microprocessor being responsive to said temperature sensor to control said electrically actuable valve to minimize consumption of fresh operating liquid.

3. A vacuum pump arrangement in accordance with claim 1, wherein:
   said first vacuum pump is a piston pump and said second pump is a liquid ring vacuum pump.

4. A vacuum pump arrangement comprising:
   a piston pump;
   a first pressure sensor and a first temperature sensor in the suction line of said piston pump;
   second pump having its suction line coupled to the exhaust of said piston pump;
   a second pressure sensor and a second temperature sensor in the suction line of said second pump; said first and second pressure and temperature sensors providing measured predetermined operational parameters of said arrangement;
   a controller for controlling the operation of said piston pump, said controller being automatically operable to continuously adjust the speed of said piston pump such that the values of said measured predetermined operational parameters correspond to predetermined parameter values.

5. A vacuum pump arrangement in accordance with claim 4, wherein:
   said controller is further operable to continuously adjust the speed of said second pump such that said measured operational parameters correspond to said predetermined parameter values.

6. A vacuum pump arrangement in accordance with claim 4, wherein:
   said controller comprises a microprocessor.

7. A vacuum pump arrangement in accordance with claim 4, comprising:
   a first drive motor for driving said piston pump;
   a second drive motor for driving said second pump; and
   sensing means for measuring at least one of the speed of said piston pump, the current drawn by said first drive motor, and the torque of said piston pump;
   said sensing means providing said measured predetermined operational parameters.

8. A vacuum pump arrangement in accordance with claim 7, wherein:
   said controller is further operable to continuously adjust the speed of said second pump such that said measured operational parameters correspond to said predetermined parameter values.

9. A vacuum pump arrangement in accordance with claim 1, wherein:
   said second pump comprises a liquid ring vacuum pump;

said second temperature sensor for measuring the suction temperature of said liquid ring vacuum pump and said second pressure sensor for measuring the pressure intermediate said piston pump and said liquid ring vacuum pump; and said controller adjusting the speed of said piston pump in accordance with the suction temperature of said liquid ring vacuum pump at a predetermined temperature dependent on the intermediate pressure between said liquid ring vacuum pump and said piston pump.

10. A vacuum pump arrangement in accordance with claim 9, comprising:

a third temperature sensor for measuring the operating liquid temperature of said liquid ring vacuum pump;

said controller being responsive to the measured value of said operating liquid temperature to adjust the speed of said liquid ring vacuum pump between a predetermined minimum speed and a predetermined maximum speed in accordance with a predetermined operating liquid temperature.

11. A vacuum pump arrangement comprising:
a suction inlet;
a first vacuum pump coupled to said suction inlet and having a first drive motor;
a second vacuum pump serially coupled to said first vacuum pump and having a second drive motor;
sensors for measuring predetermined operational parameters of said arrangement, said sensors comprise a first temperature sensor and a first pressure sensor for monitoring the temperature and pressure, respectively, in the suction line of said first vacuum pump;
at least a first motor speed circuit coupled to one of said first of second drive motors and responsive to control signals for varying the speed of said one drive motor;
interface circuits coupled to said sensors; a microprocessor coupled to said interface circuits and to said motor speed circuits and operational to compare the values of parameters measured by said sensors to predetermined parameters to generate said control signals whereby the speed of said one drive motor is adjusted.

12. A vacuum pump arrangement in accordance with claim 11, wherein:
said first vacuum pump is a piston pump and said first motor speed circuit is coupled to said piston pumps.

13. A vacuum pump arrangement in accordance with clain 11, wherein:
said sensors comprise a second temperature sensor and a second pressure sensor for monitoring the temperature and pressure, respectively, between said first and second vacuum pumps.

14. A vacuum pump arrangement in accordance with claim 11, wherein:
said first vacuum pump is a piston pump and said second pump is a liquid ring vacuum pump.

15. A vacuum pump arrangement in accordance with claim 11, comprising:
a read only memory for providing said microprocessor with data whereby predetermined parameters for said first and second pumps are calculable by said microprocessor.

16. A vacuum pump arrangement in accordance with claim 11, wherein:
said second pump is a liquid ring vacuum pump.

17. A vacuum pump arrangement in accordance with claim 16, comprising:
a second temperature sensor for measuring the operating liquid temperature of said liquid ring vacuum pump; and
said microprocessor being responsive to the measured temperature of said operating liquid to provide said control signals to adjust the speed of said liquid ring vacuum pump between a predetermined minimum speed and a predetermined maximum speed in accordance with a predetermined operating liquid temperature.

18. A vacuum pump arrangement in accordance with claim 17, comprising:
a first valve for controlling the supply of fresh liquid to said liquid ring vacuum pump;
said microprocessor being responsive to said third temperature sensor to operate said first valve.

* * * * *